United States Patent
Wu (10) Patent No.: US 11,318,944 B2
(45) Date of Patent: May 3, 2022

(54) METHOD AND APPARATUS FOR TESTING RAMP DRIVING PERFORMANCE, AND STORAGE MEDIUM

(71) Applicant: Apollo Intelligent Driving Technology (Beijing) Co., Ltd., Beijing (CN)

(72) Inventor: Nan Wu, Beijing (CN)

(73) Assignee: APOLLO INTELLIGENT DRIVING TECHNOLOGY (BEIJING) CO., LTD.

( * ) Notice: Subject to any disclaimer, the term of this patent is extended or adjusted under 35 U.S.C. 154(b) by 163 days.

(21) Appl. No.: 16/726,900

(22) Filed: Dec. 25, 2019

(65) Prior Publication Data
US 2020/0207351 A1    Jul. 2, 2020

(30) Foreign Application Priority Data

Dec. 26, 2018   (CN) .......................... 201811600249.0

(51) Int. Cl.
*B60W 30/18*       (2012.01)
*B62D 41/00*       (2006.01)
(Continued)

(52) U.S. Cl.
CPC .... *B60W 30/18118* (2013.01); *B60W 30/181* (2013.01); *B62D 41/00* (2013.01); *G05D 1/0214* (2013.01); *B60W 2050/046* (2013.01)

(58) Field of Classification Search
CPC . G01L 5/28; G01L 5/282; G01L 5/284; G01L 5/286; B60W 10/00; B60W 10/18; B60W 10/182; B60W 10/184; B60W 10/188; B60W 10/192; B60W 30/00; B60W 30/02; B60W 30/06; B60W 30/09;
(Continued)

(56) References Cited

U.S. PATENT DOCUMENTS

| 6,697,752 | B1* | 2/2004 | Korver ................... G01C 21/26 702/116 |
| 8,315,769 | B2* | 11/2012 | Braunberger ....... B60R 21/0132 701/70 |

FOREIGN PATENT DOCUMENTS

| CN | 204177978 U | 2/2015 |
| CN | 106997704 A | 8/2017 |

(Continued)

OTHER PUBLICATIONS

First Office Action issued in Chinese Patent Application No. 201811600249.0,dated Apr. 28, 2020.

*Primary Examiner* — Anthony R Jimenez
(74) *Attorney, Agent, or Firm* — Dilworth IP, LLC (57) ABSTRACT

A method and an apparatus for testing a ramp driving performance, and a storage medium, where the method includes: controlling, according to a preset traveling track, an automatic driving vehicle to perform a stopping operation when the automatic driving vehicle is traveling on a ramp to a reference position; obtaining relative position information between an actual stopping position of the automatic driving vehicle and a reference object disposed at the reference position; and determining, according to the relative position information, whether the automatic driving vehicle is accurately stopped on the ramp. The driving performance of the automatic driving vehicle in a special scenario, such as ramp stopping, can be accurately detected, thereby ensuring a driving safety of the automatic driving vehicle in the ramp stopping scenario.

18 Claims, 3 Drawing Sheets

(51) Int. Cl.
  *G05D 1/02* (2020.01)
  *B60W 50/04* (2006.01)
(58) Field of Classification Search
  CPC ......... B60W 30/18118; B60W 30/181; B60W
          30/18109; B60W 30/18172; B60W
          2050/00; B60W 2050/0001; B60W
          2050/046; B60W 2050/02; B60W
      2300/42; B60W 2520/00; B60W 2520/04;
        B60W 2520/20; B60W 2520/26; B60W
          2520/263; B60W 2520/266; B60W
      2710/18; B60W 2720/00; B60W 2720/26;
      B60W 2720/263; B60W 2720/266; B60W
            2720/28; G05D 1/0214; G05D
          2201/0213; B62D 41/00; G01M 17/007
  USPC .......................................................... 701/70
  See application file for complete search history.

(56) References Cited

FOREIGN PATENT DOCUMENTS

| | | | |
|---|---|---|---|
| CN | 107063710 | A | 8/2017 |
| CN | 107340144 | A | 11/2017 |
| CN | 108334055 | A | 7/2018 |
| CN | 108760332 | A | 11/2018 |
| FR | 3025475 | A1 | 3/2016 |

\* cited by examiner

METHOD AND APPARATUS FOR TESTING RAMP DRIVING PERFORMANCE, AND STORAGE MEDIUM

CROSS-REFERENCE TO RELATED APPLICATION

This application claims priority to Chinese Patent Application No. 201811600249.0, filed on Dec. 26, 2018, which is hereby incorporated by reference in its entirety.

TECHNICAL FIELD

The present application relates to the field of automatic driving technology, and in particular, to a method and an apparatus for testing the ramp driving performance, and a storage medium.

BACKGROUND

An automatic driving vehicle may be subjected to special driving scenarios such as ramp stopping and ramp starting during its automatic driving. By detecting a driving performance of the vehicle in the special scenario, a driving safety of the automatic driving vehicle can be ensured.

In the prior art, after a product comes out, it is necessary to test the driving performance of the automatic driving vehicle in the special driving scenario, so as to avoid a traffic failure from occurring. However, at present, there is still no such a cost-effective ramp testing method for the automatic driving vehicle to detect its driving performance in the scenarios such as the ramp stopping and the ramp starting.

SUMMARY

The present application provides a method and an apparatus for testing a ramp driving performance, and a storage medium, so as to achieving the driving performance of an automatic driving vehicle in a scenario such as ramp stopping and ramp starting.

A first aspect of the present application provides a method for testing a ramp driving performance, including:

controlling, according to a preset traveling track, an automatic driving vehicle to perform a stopping operation when the automatic driving vehicle is traveling on a ramp to a reference position; the traveling track includes performing the stopping operation at the reference position;

obtaining relative position information between an actual stopping position of the automatic driving vehicle and a reference object disposed at the reference position; and determining, according to the relative position information, whether the automatic driving vehicle is accurately stopped on the ramp.

In a possible design of the first aspect, the method further includes:

obtaining first global positioning satellite GPS track information in a first preset time period before the automatic driving vehicle is stopped at the reference position; and determining, according to the first GPS track information, whether a sliding accident occurs when the automatic driving vehicle is stopped.

In the above possible design of the first aspect, the determining, according to the first GPS track information, whether a sliding accident occurs when the automatic driving vehicle is stopped, includes:

determining that a sliding accident occurs when the automatic driving vehicle is stopped if it is determined that a switch-back traveling occurs before the automatic driving vehicle is stopped according to the first GPS track information.

In another possible design of the first aspect, the method further includes:

setting, according to an operation of a user, the traveling track of the automatic driving vehicle.

In a further possible design of the first aspect, the method further includes:

obtaining, after the automatic driving vehicle starts from the reference position, second GPS track information of the automatic driving vehicle in a second preset time period from starting from the reference position; and determining, according to the second GPS track information, a ramp starting performance of the automatic driving vehicle.

A second aspect of the present application provides an apparatus for testing a ramp driving performance, including: a control module, an obtaining module, and a determining module;

the control module is configured to control, according to a preset traveling track, an automatic driving vehicle to perform a stopping operation when the automatic driving vehicle is traveling on a ramp to a reference position; the traveling track includes performing the stopping operation at the reference position;

the obtaining module is configured to obtain relative position information between an actual stopping position of the automatic driving vehicle and a reference object disposed at the reference position; and the determining module is configured to determine, according to the relative position information, whether the automatic driving vehicle is accurately stopped on the ramp.

In a possible design of the second aspect, the obtaining module is further configured to obtain first global positioning satellite GPS track information in a first preset time period before the automatic driving vehicle is stopped at the reference position; and the determining module is further configured to determine, according to the first GPS track information, whether a sliding accident occurs when the automatic driving vehicle is stopped.

In the above possible design of the second aspect, the determining module is further configured to determine, according to the first GPS track information, whether a sliding accident occurs when the automatic driving vehicle is stopped, is specifically that:

the determining module is further specifically configured to determine that a sliding accident occurs when the automatic driving vehicle is stopped if it is determined that a switch-back traveling occurs before the automatic driving vehicle is stopped according to the first GPS track information.

In another possible design of the second aspect, the control module is further configured to set, according to an operation of a user, the traveling track of the automatic driving vehicle.

In a further possible design of the second aspect, the obtaining module is further configured to obtain, after the automatic driving vehicle starts from the reference position, second GPS track information of the automatic driving vehicle in a second preset time period from starting from the reference position; and the determining module is further configured to determine, according to the second GPS track information, a ramp starting performance of the automatic driving vehicle.

A third aspect of the present application provides an apparatus for testing a ramp driving performance, including a processor, a memory, and a computer program that is stored on the memory and is executable on the processor, where the program, when executed by the processor, implements the method of the first aspect or various possible designs of the first aspect.

A fourth aspect of the present application provides a storage medium, where the storage medium has stored thereon instructions that when run on a computer, causes the computer to perform the method of the first aspect or various possible designs of the first aspect.

A fifth aspect of the present application provides a chip for running instructions, where the chip is configured to perform the method of the first aspect or various possible designs of the first aspect.

The method and apparatus for testing the ramp driving performance, and the storage medium provided by the embodiments of the present application, control, according to a preset traveling track, an automatic driving vehicle to perform a stopping operation when the automatic driving vehicle is traveling on a ramp to a reference position; obtain relative position information between an actual stopping position of the automatic driving vehicle and a reference object disposed at the reference position; and determine, according to the relative position information, whether the automatic driving vehicle is accurately stopped on the ramp. In the technical solution, the driving performance of the automatic driving vehicle in a special scenario such as ramp stopping can be accurately detected, thereby ensuring a driving safety of the automatic driving vehicle in the ramp stopping scenario.

DESCRIPTION OF EMBODIMENTS

To make the purposes, technical solutions and advantages of the embodiments of the present application clearer, the technical solutions in the embodiments of the present application will be clearly and completely described below with reference to the drawings in the embodiments of the present application. Apparently, the described embodiments are some but not all of the embodiments of the present application. All other embodiments obtained by a person of ordinary skill in the art based on the embodiments of the present application without creative efforts fall within the protection scope of the present application.

Figure 1:
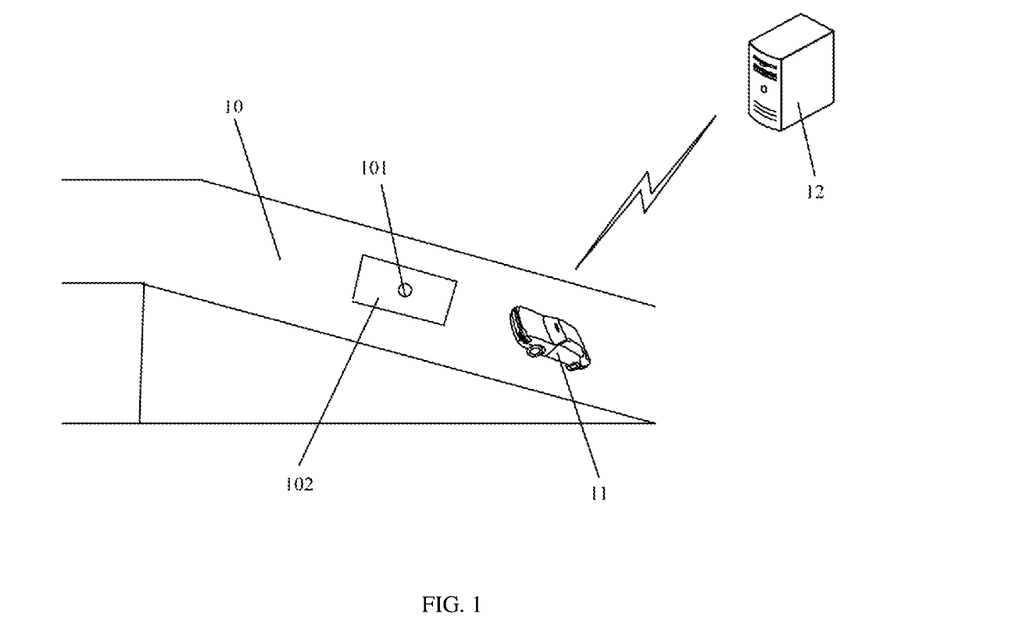
FIG. 1 is a schematic diagram of an application scenario of a method for testing a ramp driving performance according to an embodiment of the present application.

FIG. 1 is a schematic diagram of an application scenario of a method for testing a ramp driving performance according to an embodiment of the present application. As shown in FIG. 1, the application scenario of the method for testing the ramp driving performance may include a ramp area 10, an automatic driving vehicle 11 traveling within the ramp area 10, and a server 12 remotely controlling the automatic driving vehicle 11.

Exemplary, in the present embodiment, a reference position 101 and a reference object 102 are deployed within the ramp area 10. The server 12 can obtain actual position information of the reference object 102 and the reference position 101 through a global positioning system (GPS).

In the present embodiment, the automatic driving vehicle 11 can travel in the ramp area 10 under a control of the server 12, and can perform an operation such as ramp stopping or ramp starting when it travels to a position of the reference position 101; the server 12 can obtain relative position information between an actual stopping position of the automatic driving vehicle 11 and the reference object 102, or obtain GPS track information of the automatic driving vehicle 11, so as to determine the driving performance of the automatic driving vehicle in the ramp area according to the relative position information between the actual stopping position and the reference object 102, or the GPS track information.

In an embodiment, the application scenario of the method for testing the ramp driving performance shown in FIG. 1 is illustrated by taking an application scenario including the ramp area 10, the automatic driving vehicle 11, the server 12, the deployment of the reference position 101 and the reference object 102 in the ramp area 10, or the like, as an example. It should be noted that the application scenario may also include other types of devices such as roadside devices deployed in the ramp area, and sensing devices disposed on the automatic driving vehicle. The specific composition of the application scenario of the method for testing the ramp driving performance is not limited by the embodiments of the present application, which may be limited as required.

Aiming at the existing problem in the prior art that there is still no such a cost-effective ramp testing method for an automatic driving vehicle to detect its driving performance in the scenarios such as the ramp stopping and the ramp starting, the present application provides a method and an apparatus for testing a ramp driving performance, and a storage medium that can accurately detect the driving performance of the automatic driving vehicle in a special scenario such as a ramp by controlling, according to a preset traveling track, an automatic driving vehicle to perform a stopping operation when the automatic driving vehicle is traveling on a ramp to a reference position, and judging, according to relative position information between an actual stopping position of the automatic driving vehicle and a reference object disposed at the reference position, whether the automatic driving vehicle is accurately stopped on the ramp.

It should be noted that the method for testing the ramp driving performance can be applied to both a server that controls the automatic driving vehicle and the automatic driving vehicle itself. When an execution body is the server, the automatic driving vehicle can communicate with the server in real time and perform a corresponding operation according to a control instruction of the server. When the execution body is the automatic driving vehicle, the automatic driving vehicle may be prearranged with the preset traveling track in, and performs the corresponding operation according to the preset traveling track. The execution body of the method is not limited in the present embodiment, which may be determined as required.

The technical solutions of the present application are described in detail below by way of specific embodiments. It should be noted that the following several specific embodiments may be combined with each other, and same or similar concepts or processes may not be repeated in some embodiments.

Figure 2:
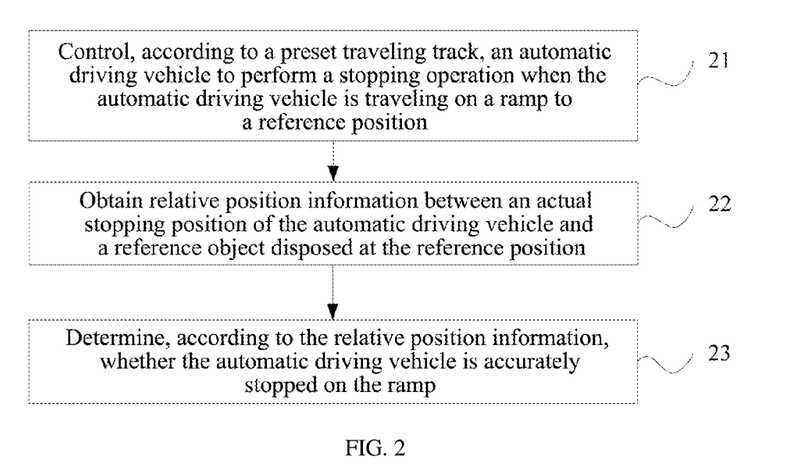
FIG. 2 is a schematic flowchart of Embodiment I of a method for testing a ramp driving performance according to an embodiment of the present application.

Exemplary, the following embodiments of the present application are described by taking the server as the execution body. FIG. 2 is a schematic flowchart of Embodiment I of a method for testing a ramp driving performance according to an embodiment of the present application. As shown in FIG. 2, the method for testing the ramp driving performance may include the following steps:

Step 21, control, according to a preset traveling track, an automatic driving vehicle to perform a stopping operation when the automatic driving vehicle is traveling on a ramp to a reference position.

The traveling track includes performing the stopping operation at the reference position.

Exemplary, in the embodiment of the present application, a tester may first determine the reference position and a reference object of the automatic driving vehicle on the ramp, and then preset the traveling track of the automatic driving vehicle in the server. In an embodiment, the traveling track includes performing the stopping operation at the reference position on the ramp, so as to detect a performance of the automatic driving vehicle when it is stopped on the ramp.

Therefore, in the present embodiment, before step 21, the method may further include the following step:

setting, according to an operation of a user, the traveling track of the automatic driving vehicle.

Exemplary, in the present embodiment, in order to detect the performance of the automatic driving vehicle when it is stopped on the ramp, the user may first set the traveling track in the server, such that the server can set the traveling track of the automatic driving vehicle according to the operation of the user, thereby enabling the automatic driving vehicle to travel according to the traveling track.

It should be noted that the reference object may be disposed at the reference position to indicate a position where the automatic driving vehicle performs the stopping operation. For example, a marked area with a same size of the automatic driving vehicle is drawn on the ground of the reference position, and the reference position may refer to a center position of the marked area. The automatic driving vehicle entering the marked area may indicate that the automatic driving vehicle travels to the reference position.

In an embodiment, during a traveling of the automatic driving vehicle on the ramp, the server may control the automatic driving vehicle to perform a braking (or stopping) operation according to the preset traveling track when it is detected that the automatic driving vehicle travels to the reference position on the ramp.

It should be noted that, in the present implementation, a traveling direction of the automatic driving vehicle may be traveling from a bottom of the ramp to a top of the ramp, or may be traveling from the top of the ramp to the bottom of the ramp. The technical solution of the present embodiment can protect the detection process in both the two traveling directions. The specific traveling direction specifically used in the present embodiment is not limited herein.

Step 22, obtain relative position information between an actual stopping position of the automatic driving vehicle and the reference object disposed at the reference position.

Exemplary, in the present embodiment, the automatic driving vehicle travels to the reference position on the ramp, and perform the stopping operation in a preset uniform deceleration motion rule, and is finally stopped at a certain position on the ramp, where the position in the embodiment is referred to as the actual stopping position.

Exemplary, after the automatic driving vehicle is stopped, the server may obtain the actual stopping position of the automatic driving vehicle.

As an example, the server may obtain real-time position information of the vehicle by using a GPS module disposed on the automatic driving vehicle, and thus, after the automatic driving vehicle is stopped, the server may obtain the actual stopping position by using the GPS module on the automatic driving vehicle. Similarly, the server may also obtain the above reference position, and thus the server may determine the relative position information between the actual stopping position and the position of the reference object according to the actual stopping position and the position of the reference object.

As another example, the tester may also obtain the relative position information between the actual stopping position of the automatic driving vehicle and the position of the reference object through a measurement on a test site, and input the relative position information to the server through a human-computer interaction interface corresponding to the server, so that the relative position information may be caught by the server.

It should be noted that the specific manner of the relative position information is not limited in the embodiment of the present application, and may be determined according to actual conditions, which will not be repeated herein.

Step 23, determine, according to the relative position information, whether the automatic driving vehicle is accurately stopped on the ramp.

Exemplary, the relative position information may include distance offset information and angle offset information. Therefore, by determining the distance offset information between the actual stopping position of the automatic driving vehicle and the reference object, it can be determined whether vertical displacement information of the automatic driving vehicle is accurate when it is stopped on the ramp; by determining the angle offset information between the actual stopping position of the automatic driving vehicle and the reference objects, it can be determined whether horizontal offset information of the automatic driving vehicle satisfies a requirement when it is stopped on the ramp.

In an embodiment, when the server determines that both the vertical offset information and the horizontal offset information between the actual stopping position of the automatic driving vehicle and the reference object falls within a preset threshold range, it is determined that the automatic driving vehicle is accurately stopped on the ramp, otherwise it is determined that the automatic driving vehicle is not accurately stopped on the ramp.

For example, for a stopping operation performed by the automatic driving vehicle in a traveling process from the top of the ramp to the bottom of the ramp, since an inclination of the ramp, under an action of gravity, it is likely that the automatic driving vehicle will continue to slide down due to an unstable stopping at the actual stopping position. At this time, the vertical offset information between the actual stopping position of the automatic driving vehicle and the reference object is greater than an upper limit value of the preset threshold range, and then, it can be determined that a sliding accident occurs when the automatic driving vehicle is stopped.

In the method for testing the ramp driving performance provided by the embodiment of the present application, the server controls, according to a preset traveling track, an automatic driving vehicle to perform a stopping operation when the automatic driving vehicle is traveling on a ramp to a reference position, obtains relative position information between an actual stopping position of the automatic driving vehicle and a reference object disposed at the reference position, and determines, according to the relative position information, whether the automatic driving vehicle is accurately stopped on the ramp. In the technical solution, the driving performance of the automatic driving vehicle in a special scenario such as ramp stopping can be accurately detected, thereby ensuring a driving safety of the automatic driving vehicle in the ramp stopping scenario.

Figure 3:
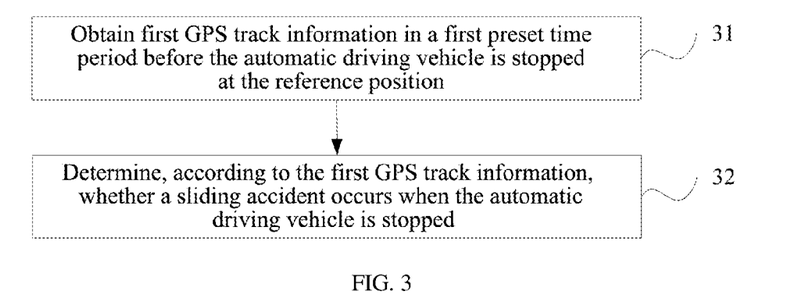
FIG. 3 is a schematic flowchart of Embodiment II of a method for testing a ramp driving performance according to an embodiment of the present application.

Exemplary, based on the preceding embodiment, FIG. 3 is a schematic flowchart of Embodiment II of a method for testing a ramp driving performance according to an embodiment of the present application. As shown in FIG. 3, in the present embodiment, the method for testing the ramp driving performance may further include the following steps:

Step 31, obtain first GPS track information in a first preset time period before the automatic driving vehicle is stopped at the reference position.

In the embodiment, the server, when controlling, according to the preset traveling track, the automatic driving vehicle to perform the stopping operation when the automatic driving vehicle is traveling on the ramp to the reference position, collects the first GPS track information of the automatic driving vehicle in a process from starting the stopping operation to being completely stopped. The first GPS track information can accurately display running route information of the automatic driving vehicle.

Exemplary, a time required for the automatic driving vehicle from starting the stopping operation to being completely stopped may be referred to as the first preset time period. Thus, the server can obtain the first GPS track information in the first preset time period by using the GPS module disposed on the automatic driving vehicle.

Step 32, determine, according to the first GPS track information, whether a sliding accident occurs when the automatic driving vehicle is stopped.

Exemplary, in the present embodiment, the server, after obtaining the first GPS track information in the process from starting the stopping operation to being completely stopped, determines whether a sliding accident occurs when the automatic driving vehicle is stopped according to a traveling track corresponding to the first GPS track information and the reference position.

For example, the server may judge according to whether the traveling track corresponding to the first GPS track information has a switch-back phenomenon.

Specifically, if the traveling track corresponding to the first GPS track information has a switch-back phenomenon, that is, after the automatic driving vehicle travels to a certain position, the vehicle further travels in an opposite direction for a certain distance before it is stopped, then it can be determined that a sliding accident occurs when the automatic driving vehicle is stopped.

For example, the server may further determine a target stopping position of the automatic driving vehicle according to the reference position and a vehicle speed of the automatic driving vehicle, and further determine whether the automatic driving vehicle has a sliding accident according to a positional relationship between the target stopping position and the traveling track corresponding to the first GPS track information.

Specifically, if the target stopping position is a destination of the traveling track corresponding to the first GPS track information, it is impossible to determine whether the automatic driving vehicle has a sliding accident. For example, the automatic driving vehicle is just stopped at the target stopping position, then it is determined that the automatic driving vehicle does not have a sliding accident. If the automatic driving vehicle does not reach the target stopping position when it is stopped, but just slides to the target stopping position due to an unstable stopping, it is determined at this time that the automatic driving vehicle has a sliding accident.

The method for testing the ramp driving performance provided by the embodiment of the present application obtains first global positioning satellite GPS track information in a first preset time period before the automatic driving vehicle is stopped at the reference position, and determines, according to the first GPS track information, whether a sliding accident occurs when the automatic driving vehicle is stopped. In the technical solution, the traveling track of the automatic driving vehicle can be accurately determined according to the GPS track information, thereby a ramp stopping performance of the automatic driving vehicle is accurately determined.

Figure 4:
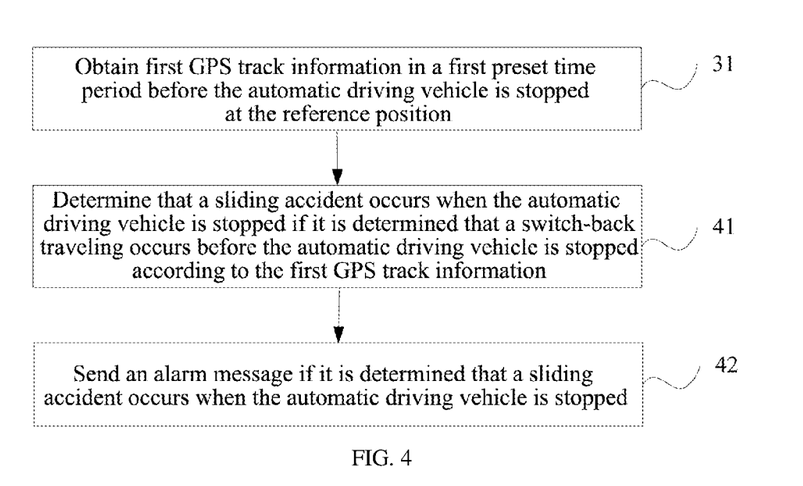
FIG. 4 is a schematic flowchart of Embodiment III of a method for testing a ramp driving performance according to an embodiment of the present application.

Exemplary, based on the preceding embodiment, FIG. 4 is a schematic flowchart of Embodiment III of a method for testing a ramp driving performance according to an embodiment of the present application. As shown in FIG. 4, in the embodiment, the above step 32 (determine, according to the first GPS track information, whether a sliding accident occurs when the automatic driving vehicle is stopped) can be implemented by the following steps:

Step 41, determine that a sliding accident occurs when the automatic driving vehicle is stopped if it is determined that a switch-back traveling occurs before the automatic driving vehicle is stopped according to the first GPS track information.

Specifically, for the stopping operation performed by the automatic driving vehicle in the process traveling from the top of the ramp to the bottom of the ramp, since an inclination of the ramp, under an action of gravity, it is likely that the automatic driving vehicle will slide down in an opposite direction due to an unstable stopping at the actual stopping position. At this time, the formed traveling track corresponding to the first GPS track information has a switch-back phenomenon, and at this time, then it can be determined that a sliding accident occurs when the automatic driving vehicle is stopped.

Figure 5:
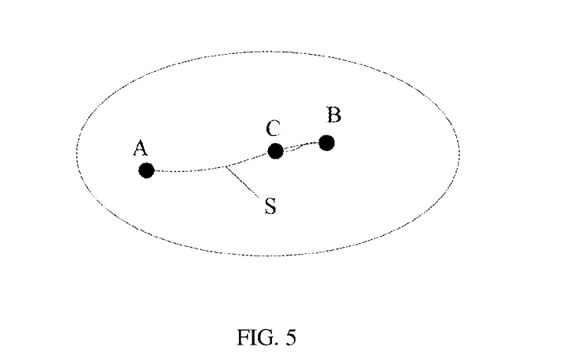
FIG. 5 is a schematic diagram of a traveling track corresponding to first GPS track information when an automatic driving vehicle is stopped on a ramp.

Exemplary, FIG. 5 is a schematic diagram of the traveling track corresponding to the first GPS track information when the automatic driving vehicle is stopped on the ramp. As shown in FIG. 5, the reference position where the automatic driving vehicle performs the stopping operation is point A, the target stopping position is point B, the actual stopping position is point C, and the traveling track corresponding to the first GPS track information is S. Referring to FIG. 5, the automatic driving vehicle, after traveling from point A to point B, travels to point A again, and is finally stopped at point C, causing the traveling track S (A-B-C) to have a switch-back phenomenon. At this time, it is determined that a sliding accident occurs when the automatic driving vehicle is stopped.

In an embodiment, as shown in FIG. 4, after the step 32, the following steps may also be included:

Step 42, send an alarm message if it is determined that a sliding accident occurs when the automatic driving vehicle is stopped.

In the present embodiment, the server, when determining that a sliding accident occurs when the automatic driving vehicle is stopped, may send the alarm message based on a preset response type, so as to avoid a traffic accident due to the sliding phenomenon that is not discovered timely.

For example, a visual reminder is used, for example, a light color of a fault prompting light, a double flash, or the like. A sound reminder is used, for example, to emit sounds of different types or different durations, or the like. The specific expression of the alarm message is not limited in the embodiment of the present application and may be determined according to actual conditions, which will not be repeated herein.

The method for testing the ramp driving performance provided by the embodiment of the present application, determines that a sliding accident occurs when the automatic driving vehicle is stopped if it is determined that a switch-back traveling occurs before the automatic driving vehicle is stopped according to the first GPS track information, and sends an alarm message when it is determined that a sliding accident occurs when the automatic driving vehicle is stopped. The technical solution can promptly remind the tester at the time a sliding accident occurs when the auto-driving vehicle is stopped, which may avoid a traffic accident from occurring to a certain extent, and improve the driving safety of the automatic driving vehicle when it is stopped on the ramp.

Figure 6:
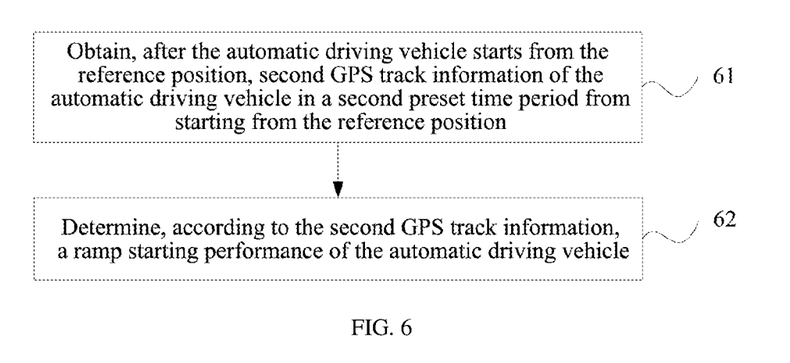
FIG. 6 is a schematic flowchart of Embodiment IV of a method for testing a ramp driving performance according to an embodiment of the present application.

Exemplary, based on the preceding embodiments, FIG. 6 is a schematic flowchart of Embodiment IV of a method for testing a ramp driving performance according to an embodiment of the present application. As shown in FIG. 6, in the present embodiment, the method for testing the ramp driving performance may further include the following steps:

Step 61, obtain, after the automatic driving vehicle starts from the reference position, second GPS track information of the automatic driving vehicle in a second preset time period from starting from the reference position.

Exemplary, in the present embodiment, the automatic driving vehicle may be controlled to start from the reference position on the ramp, so as to detect a ramp starting performance of the automatic driving vehicle. Normally, a ramp starting of the automatic driving vehicle is generally detected when the automatic driving vehicle travels from the reference position to the top of the ramp.

Exemplary, the server, after detecting that the automatic driving vehicle starts from the reference position, may collect the second GPS track information of the automatic driving vehicle in a preset time period after starting a starting operation. In the present embodiment, the preset time period is referred to as the second preset time period.

Step 62, determine, according to the second GPS track information, the ramp starting performance of the automatic driving vehicle.

In the present embodiment, the server, after obtaining the second GPS track information, judges whether a sliding accident occurs in the starting process of the automatic driving vehicle according to a traveling track corresponding to the second GPS track information.

For example, the server may judge according to whether the traveling track corresponding to the second GPS track information has a switch-back phenomenon.

Specifically, if the traveling track corresponding to the second GPS track information has a switch-back phenomenon, that is, the automatic driving vehicle, after retreating a certain distance towards the traveling direction, travels forward, then it can be determined that a sliding accident occurs when the automatic driving vehicle is stopped.

The method for testing the ramp driving performance provided by the embodiment of the present application, the server obtains, after the automatic driving vehicle starts from the reference position, second GPS track information of the automatic driving vehicle in a second preset time period from starting from the reference position, and determines, according to the second GPS track information, a ramp starting performance of the automatic driving vehicle. The technical solution can accurately determine the ramp starting performance of the automatic driving vehicle, and has high efficiency.

The following are apparatus embodiments of the present application, which may be configured to implement the method embodiments of the present application. For details not disclosed in the apparatus embodiments of the present application, reference is made to the method embodiments of the present application.

Figure 7:
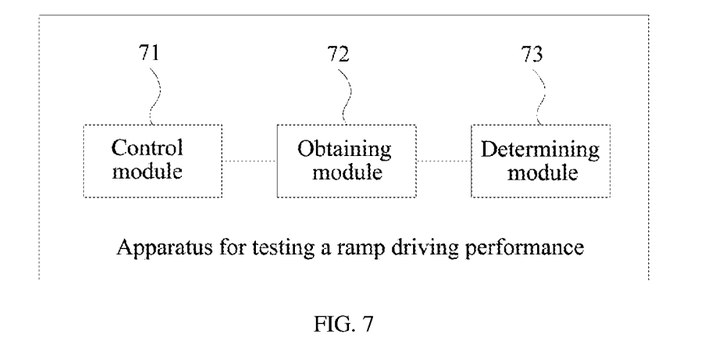
FIG. 7 is a schematic structural diagram of Embodiment I of an apparatus for testing a ramp driving performance according to an embodiment of the present application.

FIG. 7 is a schematic structural diagram of Embodiment I of an apparatus for testing a ramp driving performance according to an embodiment of the present application. The apparatus can be integrated in a server or be implemented through a server. As shown in FIG. 7, the apparatus may include a control module 71, an obtaining module 72, and a determining module 73.

The control module 71 is configured to control, according to a preset traveling track, an automatic driving vehicle to perform a stopping operation when the automatic driving vehicle is traveling on a ramp to a reference position; the traveling track includes performing the stopping operation at the reference position;

the obtaining module 72 is configured to obtain relative position information between an actual stopping position of the automatic driving vehicle and a reference object disposed at the reference position; and the determining module 73 is configured to determine, according to the relative position information, whether the automatic driving vehicle is accurately stopped on the ramp.

Exemplary, in a possible design of the present embodiment, the obtaining module 72 is further configured to obtain first global positioning satellite GPS track information in a first preset time period before the automatic driving vehicle is stopped at the reference position; and the determining module 73 is further configured to determine, according to the first GPS track information, whether a sliding accident occurs when the automatic driving vehicle is stopped.

In an embodiment, the determining module 73 is further configured to determine, according to the first GPS track information, whether a sliding accident occurs when the automatic driving vehicle is stopped, is specifically:

the determining module 73 is further specifically configured to determine that a sliding accident occurs when the automatic driving vehicle is stopped if it is determined that a switch-back traveling occurs before the automatic driving vehicle is stopped according to the first GPS track information.

Exemplary, in another possible design of the present embodiment, the control module 71 is further configured to set, according to an operation of a user, the traveling track of the automatic driving vehicle.

Exemplary, in a further possible design of the embodiment, the obtaining module 72 is further configured to obtain, after the automatic driving vehicle starts from the reference position, second GPS track information of the automatic driving vehicle in a second preset time period from starting from the reference position; and the determining module 73 is further configured to determine, according to the second GPS track information, a ramp starting performance of the automatic driving vehicle.

The apparatus provided by the embodiment of the present application can be configured to perform the methods in the embodiments shown in FIG. 2 to FIG. 6, and the implementation principles and technical effects thereof are similar, which will not be repeated herein.

It should be noted that the division of the modules of the above apparatus is only a division of logical functions, the modules can be integrated in whole or in part into one physical entity in the actual implementation, and can be physically separated. These modules can all be implemented by software in the form of processing component calls; or all of them can also be implemented entirely in hardware; some modules can be implemented in the form of processing component calling software, and some modules can be implemented in hardware. For example, the determining module can be a separate processing component, and can also be integrated in one chip of the above apparatuses for implementation. In addition, it may be stored in a memory of the above apparatus in the form of the program code, and the function of the above determining module is called and performed by one processing component of the above apparatus. The implementation of other modules is similar. In addition, all or part of these modules can be integrated or implemented independently. The processing component described herein can be an integrated circuit with a signal processing capability. In the implementation process, each step of the above method or each of the above modules may be completed by an integrated logic circuit of hardware in the processor element or by instructions in a form of software.

For example, the above modules may be one or more integrated circuits configured to implement the above methods, such as one or more application specific integrated circuits (ASICs), or one or more digital signal processor (DSP), or one or more field programmable gate arrays (FPGAs). As another example, when one of the above modules is implemented in the form of a processing component calling program code, the processing component can be a general purpose processor, such as a central processing unit (CPU) or another processor that can call the program code. As another example, these modules can be integrated and be implemented in the form of a system-on-a-chip (SOC).

In the above embodiments, it may be implemented in whole or in part by software, hardware, firmware, or any combination thereof. When implemented in software, it may be implemented in whole or in part in the form of a computer program product. The computer program product includes one or more computer instructions. When the computer program instructions are loaded and executed on a computer, the processes or functions described in accordance with embodiments of the present application are generated in whole or in part. The computer can be a general purpose computer, a special purpose computer, a computer network, or other programmable apparatuses. The computer instructions can be stored in a computer readable storage medium or transferred from one computer readable storage medium to another computer readable storage medium; for example, the computer instructions can be transmitted in a wired manner (such as a coaxial cable, an optical fiber, a digital subscriber line (DSL)) or a wireless manner (such as infrared, wireless, microwave, or the like) from one website site, computer, server or data center to another website site, computer, server, or data center. The computer readable storage medium can be any available media that can be accessed by a computer or a data storage device such as a server, data center that includes one or more available media. The available medium may be a magnetic medium (such as a floppy disk, a hard disk, a magnetic tape), an optical medium (such as a DVD), or a semiconductor medium (such as a solid state disk (SSD)), or the like.

Figure 8:
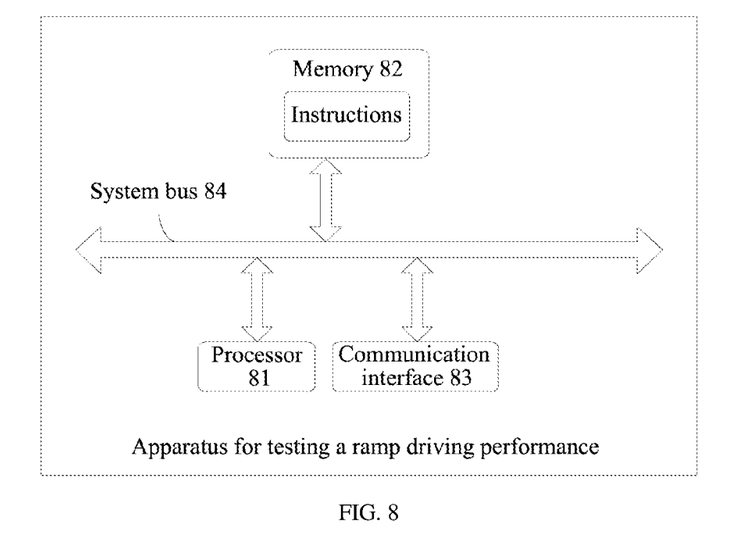
FIG. 8 is a schematic structural diagram of Embodiment II of an apparatus for testing a ramp driving performance according to an embodiment of the present application.

FIG. 8 is a schematic structural diagram of Embodiment II of an apparatus for testing a ramp driving performance according to an embodiment of the present application. As shown in FIG. 8, the apparatus may include a processor 81, a memory 82, a communication interface 83, and a system bus 84. The memory 82 and the communication interface 83 are connected to the processor 81 via the system bus 84 and complete communication with each other, the memory 82 is used for storing computer execution instructions, the communication interface 83 is used for communicating with other devices, and the processor 81 implements the solutions of the embodiments shown in FIG. 2 to FIG. 6 when executing the computer program.

The system bus described in FIG. 8 may be a peripheral component interconnect (PCI) bus or an extended industry standard architecture (EISA) bus, or the like. The system bus can be divided into an address bus, a data bus, a control bus, or the like. For ease of expression, only one thick line is shown in the figure, but it does not mean that there is only one bus or one type of bus. The communication interface is used to implement communication between a database access apparatus and other devices such as a client, a read-write library, and a read-only library. The memory may include a random access memory (RAM), and may also include a non-volatile memory, such as at least one disk memory.

The above processor may be a general purpose processor, including a central processing unit (CPU), a network processor (NP), or the like; or may be a digital signal processor (DSP), an application specific integrated circuit (ASIC), a field programmable gate array (FPGA) or other programmable logic devices, discrete gates or transistor logic devices, discrete hardware components.

An embodiment of the present application further provides a storage medium, where the storage medium has stored thereon instructions that when run on a computer, causes the computer to perform the methods of the embodiments shown in above described FIG. 2 to FIG. 6.

An embodiment of the present application further provides a chip for running instructions, where the chip is configured to perform the methods of the embodiments shown in above described FIG. 2 to FIG. 6.

An embodiment of the present application further provides a program product, where the program product includes a computer program, where the computer program is stored in a storage medium, at least one processor can read the computer program from the storage medium, and the at least one processor can implements the methods of the embodiments shown in above described FIG. 2 to FIG. 6 when performing the computer program.

In the present application, "at least one" means one or more, and "a plurality" means two or more. "and/or"

describes an association relationship of associated objects, indicating that there may be three relationships, for example, A and/or B may indicate: A exists separately, A and B exist at the same time, and B exists separately; where A, B can be singular or plural. The character "/" generally indicates that contextual objects are of an "or" relationship; in the formula, the character "/" indicates that the contextual objects are of a "division" relationship. "At least one of the following" or a similar expression thereof refers to any combination of these items, including any combination of a single item or a plurality of items. For example, at least one of a, b, or c may indicate: a, b, c, a-b, a-c, b-c, or a-b-c, where a, b and c may be singular one or plural.

It is to be understood that the various numbers in the embodiments of the present application are only for convenience of description, and are not to be construed as limiting the scope of the embodiments.

It should be understood that, in the embodiments of the present application, the size of the sequence numbers of the preceding processes does not indicate an execution order, and the execution order of the processes should be determined by their functions and internal logics and are not intended to limit the implementation of the embodiments of the present application.

Finally, it should be noted that the above embodiments are merely illustrative of the technical solutions of the present application, and are not to be taken in a limiting sense; although the present application has been described in detail with reference to the above embodiments, a person of ordinary skill in the art will understand that they may still modify the technical solutions described in the above embodiments, or equivalently substitute some or all of the technical features; and the modifications or substitutions do not deviate the nature of the corresponding technical solutions from the scope of the technical solutions of the embodiments of the present application.

What is claimed is:

1. A method for testing a ramp driving performance, comprising:
controlling, according to a preset traveling track, an automatic driving vehicle to perform a stopping operation in a condition that the automatic driving vehicle is traveling on a ramp to a reference position; the traveling track comprises the reference position at which the stopping operation is performed;
obtaining relative position information between an actual stopping position of the automatic driving vehicle and a reference object disposed at the reference position; and
determining, according to the relative position information, whether the automatic driving vehicle is accurately stopped on the ramp, and
the method further comprises:
obtaining first global positioning satellite (GPS) track information during a first preset time period before the automatic driving vehicle is stopped at the reference position; and
determining, according to the first GPS track information, whether a sliding accident occurs in a condition that the automatic driving vehicle is stopped.

2. A nonvolatile memory, wherein the nonvolatile memory has stored thereon instructions that a condition that run on a computer, causes the computer to perform the method of claim 1.

3. The method of claim 1, wherein the determining, according to the first GPS track information, whether a sliding accident occurs in a condition that the automatic driving vehicle is stopped, comprises:
determining that a sliding accident occurs in a condition that the automatic driving vehicle is stopped in a condition that it is determined that a switch-back traveling occurs before the automatic driving vehicle is stopped according to the first GPS track information.

4. The method of claim 1, wherein the determining, according to the first GPS track information, whether a sliding accident occurs in a condition that the automatic driving vehicle is stopped, further comprises:
sending an alarm message in a condition that it is determined that a sliding accident occurs in a condition that the automatic driving vehicle is stopped.

5. The method of claim 1, further comprising:
setting, according to an operation of a user, the traveling track of the automatic driving vehicle.

6. The method of claim 1, further comprising:
obtaining, after the automatic driving vehicle starts from the reference position, second GPS track information of the automatic driving vehicle during a second preset time period from starting from the reference position; and
determining, according to the second GPS track information, a ramp starting performance of the automatic driving vehicle.

7. The method of claim 1, wherein the relative position information comprises distance offset information and angle offset information.

8. The method of claim 7, wherein the determining, according to the relative position information, whether the automatic driving vehicle is accurately stopped on the ramp, comprises:
determining whether vertical displacement information of the automatic driving vehicle is accurate in a condition that it is stopped on the ramp according to the distance offset information; and
determining whether horizontal offset information of the automatic driving vehicle is accurate in a condition that it is stopped on the ramp according to the angle offset information.

9. The method of claim 8, wherein the determining, according to the relative position information, whether the automatic driving vehicle is accurately stopped on the ramp, further comprises:
determining that the automatic driving vehicle is accurately stopped on the ramp in a condition that it is determined that both the vertical displacement information and the horizontal offset information of the automatic driving vehicle are accurate in a condition that it is stopped on the ramp.

10. An apparatus for testing a ramp driving performance, comprising: a transceiver, a non-volatile memory, a processor, and a computer program stored on the memory and operable on the processor,
wherein the processor, when running the computer program, is configured to:
control, according to a preset traveling track, an automatic driving vehicle to perform a stopping operation in a condition that the automatic driving vehicle is traveling on a ramp to a reference position; the traveling track comprises the reference position at which the stopping operation is performed;
obtain relative position information between an actual stopping position of the automatic driving vehicle and a reference object disposed at the reference position; and determine, according to the relative position information, whether the automatic driving vehicle is accurately stopped on the ramp, and the processor is further configured to:

obtain first global positioning satellite (GPS) track information during a first preset time period before the automatic driving vehicle is stopped at the reference position; and determine, according to the first GPS track information, whether a sliding accident occurs in a condition that the automatic driving vehicle is stopped.

11. The apparatus of claim 10, wherein the processor is further configured to determine that a sliding accident occurs in a condition that the automatic driving vehicle is stopped in a condition that it is determined that a switch-back traveling occurs before the automatic driving vehicle is stopped according to the first GPS track information.

12. The apparatus of claim 10, wherein the processor is further configured to send an alarm message in a condition that it is determined that a sliding accident occurs in a condition that the automatic driving vehicle is stopped.

13. The apparatus of claim 10, wherein the processor is further configured to set, according to an operation of a user, the traveling track of the automatic driving vehicle.

14. The apparatus of claim 10, wherein, the processor is further configured to:

obtain, after the automatic driving vehicle starts from the reference position, second GPS track information of the automatic driving vehicle during a second preset time period from starting from the reference position; and determine, according to the second GPS track information, a ramp starting performance of the automatic driving vehicle.

15. The apparatus of claim 10, wherein the relative position information comprises distance offset information and angle offset information.

16. The apparatus of claim 15, wherein the processor is further configured to:

determine whether vertical displacement information of the automatic driving vehicle is accurate in a condition that it is stopped on the ramp according to the distance offset information.

17. The apparatus of claim 16, wherein the processor is further configured to:

determine whether horizontal offset information of the automatic driving vehicle is accurate in a condition that it is stopped on the ramp according to the angle offset information.

18. The apparatus of claim 17, wherein the processor is further configured to:

determine that the automatic driving vehicle is accurately stopped on the ramp in a condition that it is determined that both the vertical displacement information and the horizontal offset information of the automatic driving vehicle are accurate in a condition that it is stopped on the ramp.

* * * * *